Dec. 7, 1937. J. R. BJORKLUND 2,101,528
MEANS FOR TREATING LIQUID CONTAINING COMPRESSIBLE BODIES OF MATERIAL
Filed Nov. 18, 1935
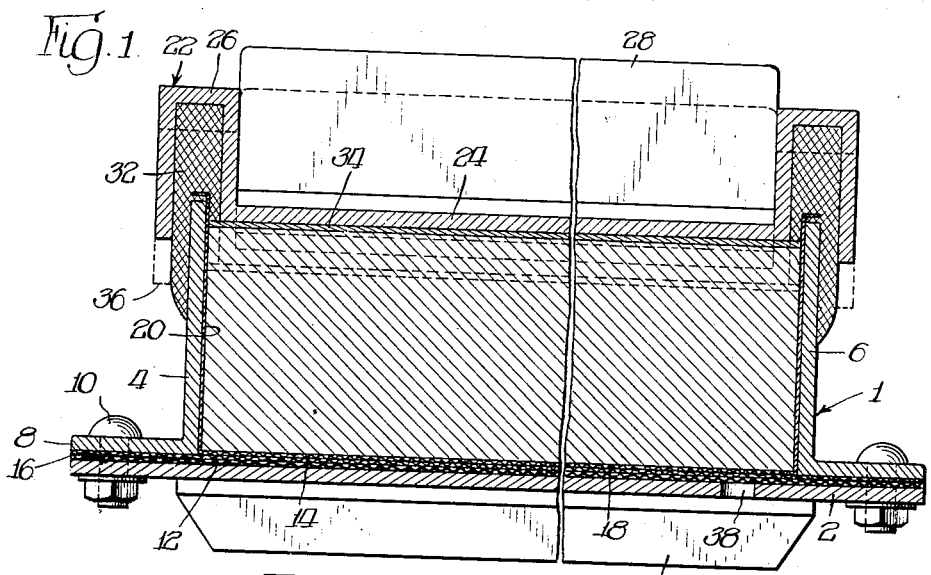
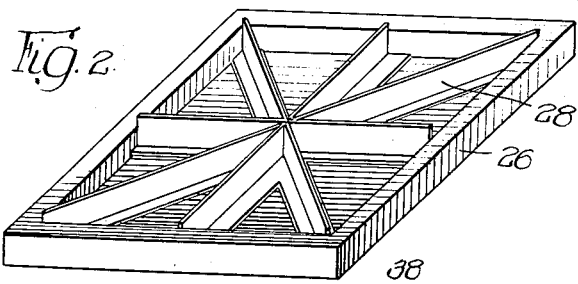
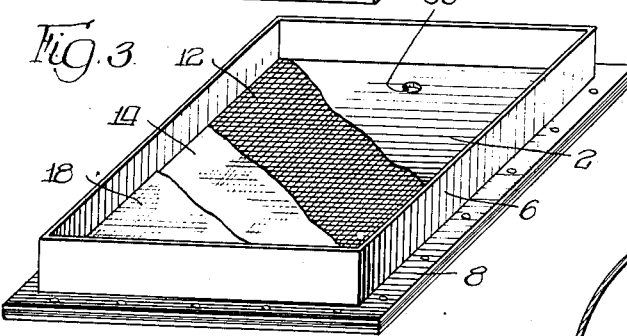
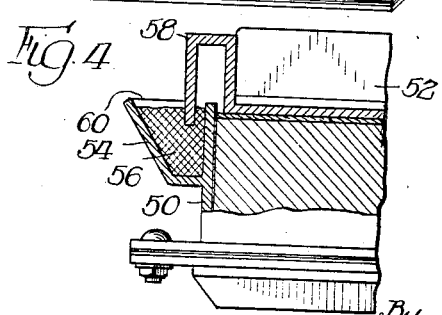
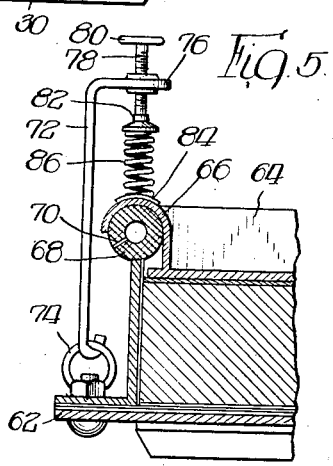
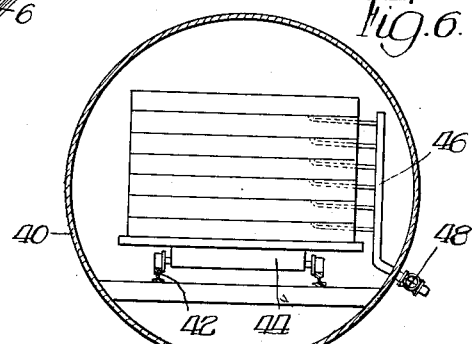
Inventor:
John R. Bjorklund Patented Dec. 7, 1937

2,101,528

UNITED STATES PATENT OFFICE 2,101,528

MEANS FOR TREATING LIQUID CONTAINING COMPRESSIBLE BODIES OF MATERIAL

John R. Bjorklund, Chicago, Ill., assignor to Northwestern Terra Cotta Corp., Chicago, Ill., a corporation of Illinois Application November 18, 1935, Serial No. 50,335

4 Claims. (Cl. 25—45)

The present invention relates to novel means for and method of treating liquid containing compressible bodies of material, such as clay, concrete and the like.

An object of the present invention is to provide a novel process or method of treating a mass or body of material containing a liquid whereby the material may be molded and shaped and the excess liquid simultaneously removed therefrom to any desired extent.

The present invention also comprehends the idea of providing a novel device or apparatus which can be easily and conveniently manipulated to receive this body of material whereby the same may be compressed and molded simultaneously with the extraction of liquid contained therein.

Heretofore various attempts have been made to work and compact material such as clay, concrete aggregate and other like materials, and at the same time mold and remove the excess water or other liquid contained therein. The methods followed have not produced finished articles having substantially uniform compactness throughout their entire mass. These articles, when compressed, have also been of varying dimensions where uniformity thereof has been desired, and water or other liquid therefrom has not been uniformly removed, which is also to be desired. It will be appreciated that where water or some similar liquid is used in working clay, or the like, or a mix or aggregate of other materials, this water or other liquid is needed to facilitate proper forming and molding of the material or materials. It is necessary, however, in order to provide articles of uniform quality, density, dimensions and possessing desirable structural characteristics free from voids, cracks, or other imperfections, to remove a large part of this water or other liquid which is necessary to proper working and handling. In many processes it is also desirable to remove water or other liquid present in various materials to render the same of commercial value or to prepare the same for further treatment.

It is therefore an object of the present invention to provide novel means for and a method of simultaneously molding, compressing and removing excess liquid from materials such as indicated above, whereby the resulting products are of substantially uniform texture, composition, size and dimension, free from imperfections and have a resulting uniform moisture content throughout their entire mass and whereby the materials, if further worked or treated, will result in articles having the desired dimensions, strength and physical characteristics.

More particularly, the present invention includes the idea of providing a molding or pressure device which can be easily manipulated for successive operations whereby a plurality of molded or compressed articles may be formed in a minimum of time, the molding or pressure device comprising relatively movable mold parts with a flexible fluid-tight joint therebetween whereby material disposed therein may be compressed upon subjecting the mold parts to a pressure. This molding or pressure device is further provided with at least one opening communicating with a filter bed whereby the pressure of the material within the compartment is always maintained less than the pressure applied to the exterior of the mold. Also, means is further contemplated for providing communication between the atmosphere and the space within the mold whereby excess liquid is removed from the material disposed therein.

Another object of the present invention is to provide novel means for initially placing the flexible sealing means between the two movable parts of the mold under pressure, which provides a fluid-tight joint therebetween.

Other objects, features, capabilities and advantages are comprehended by the invention, as will later appear and as are inherently possessed thereby.

Referring to the drawing:

Figure 1 is a broken view in cross section of a device made in accordance with the present invention;

Figures 2 and 3 are views in perspective of the two parts forming the pressure or molding device of Figure 1 of the drawing;

Figure 4 is a fragmentary view in cross section with parts broken away of a modified form of construction for the mold or pressure device;

Figure 5 is a fragmentary view in cross section of still another modified form of the present invention, disclosing means for initially compressing the sealing member between the two parts forming the device; and Figure 6 is a view in cross section of a pressure tank or compartment disclosing a plurality of molds or pressure devices disposed therein, the same being treated in accordance with the method disclosed herein.

Referring now more in detail to the drawing, a mold or pressure device made in accordance with the present invention is disclosed in Figures 1, 2 and 3 as comprising a receptacle or pan 1 formed with a base plate 2 and the side walls, such as 4 and 6 providing a receptacle for receiving material containing a liquid, such as water or the like, the walls 4 and 6 being in the shape of an angle, the laterally extending flanges 8 of which form a support therefor and are secured to the base plate 2 as by means of a plurality of bolts, such as 10. Disposed on the upper surface of the base plate 2 is a metal screen 12 and upon which is a sheet or strip of canvas duck or any other suitable filter cloth 14, these two sheets or strips of material extending laterally between the base plate 2 and the flanges 8 of the walls and being secured in position by the bolts 10, a suitable sealing material 16 being provided between these two sheets for a width substantially equal to the width of the base flanges 8 of the walls to provide a fluid-tight joint between the walls and the base plate when the bolts 10 are suitably tightened. Disposed upon the canvas duck or filter cloth 14 is another strip of canvas duck or filter cloth 18 of a size to fit between the side walls 4 and 6, which duck or filter cloth serves to facilitate the easy removal of the compressed material from the filter bed comprising the metal screen 12 and canvas duck or filter cloth 14. The walls 4 and 6 are also lined with a sheet of material 20 which also serves to facilitate or assist in the easy removal of the compressed material from the surfaces of the mold at these points.

As previously indicated, the present invention contemplates structure which may be readily handled and manipulated and which effectively produces a molded compressed article of uniform size and thickness and uniformly compacted throughout its entire mass, this being effected by the elimination of excess water or other liquid from the material, which results in the uniform retention throughout the entire body of the material of the moisture or liquid remaining. In order to accomplish this result, the base or pressure pan is provided with a closure member, generally referred to as 22, which comprises a central plate 24 having the continuous marginal channel 26 either formed integral therewith or separately and welded thereto, the same extending above the plate and being adapted to be disposed above the ends of the walls 4 and 6 forming the pan or receptacle of the base. The closure member may be suitably reinforced and braced by reinforcing members 28, which reinforcing structure may likewise be provided to reinforce and to prevent buckling of the base plate 2, this latter reinforcing being designated as 30.

The fluid-tight joint between the closure member and the walls of the receptacle or pan 1 may be secured by the use of any suitable flexible material, such as mastic 32 or the like disposed within the continuous marginal channel 26 of the cover plate or closure member, a sufficient amount being provided to insure a tight joint irrespective of the pressure which may be necessary to suitably compress the material being treated within the device.

The material to be treated is introduced into the receptacle or pan 1 to the proper level, after which the closure member is moved into place as disclosed in solid lines in Figure 1 of the drawing, an absorption cushion 34 being disposed between the top of the material in the pan and the closure member, this cushion being used to absorb trapped air on the surface of the material being compressed. After the closure member has been inserted in place, the entire device may be subjected to an external fluid pressure which causes the closure member 22 to move downwardly, as indicated by dotted lines 36 or Figure 1 of the the drawing, thereby compressing the material within the receptacle or base 2, the excess liquid or water within the device being removed through at least one opening such as 38 provided in the base plate 2. It will be readily appreciated that the application of the fluid pressure to the entire surface of the closure member causes the same to move downwardly uniformly and to effect a uniform compression or compactness of the material being treated in the device. The material so treated has a remaining moisture content, if any, substantially equally and uniformly distributed throughout its entire mass, and the same is of uniform thickness and size, as well as free from voids or imperfections which might otherwise occur due to improper compression and uneven removal of excess water.

Although the present invention contemplates the idea of applying an external force uniformly to a single device, as disclosed in Figure 1, it has been found that more efficient work may be accomplished by providing, as shown in Figure 6 of the drawing, a pressure tank or compartment 40 which may be provided with a track 42 over which may be run one or more trucks or cars 44 upon which is disposed a plurality of these molding or pressure devices. It has also been found desirable to provide a conduit or duct 46 having communication with the atmosphere through a valve 48 and also with the interior of the molding or pressure device as through an opening such as 38. One or more of these trucks may be moved into the pressure tank, after which the door or closure member is closed and sealed and a fluid pressure applied therein. This fluid pressure operates to move the closure members of the molding or pressure devices downwardly, as above described, during which excess water or other liquid is removed from the material therein through the conduit or duct 46. After the material in these devices is treated to the extent desired, the individual ducts leading from the duct 46 to each of the devices may be disconnected and the trucks removed, and the compacted articles from each of the devices removed, and matured or otherwise operated upon as desired.

The present invention also contemplates a device as disclosed in Figure 4 of the drawing, the same comprising a mold part 50 and a closure member 52 which cooperate to compress a body of material as in the device disclosed in Figure 1, the mold part 50 being of substantially the same construction as the bottom mold part of the device of Figure 1, with the exception that the upstanding walls thereof are provided with a continuous channel 54 which is adapted to retain a flexible or plastic sealing material, such as mastic or the like 56, and into which the outer wall forming the continuous channel 58 of the closure member 52 extends to provide a fluid-tight joint between these two parts of the mold. Instead of using material having the consistency of mastic, the channel 54 may be filled to substantially the level indicated as 60, with water or some other similar liquid which provides an effective seal between the two parts of the mold. The operation of this device is substantially the same as previously discussed in relation to the structure of Figure 1, and the product resulting from an application of pressure to the exterior of the mold is of substantially uniform compactness free from excess water and of uniform dimensions.

In Figure 5 of the drawing still another modification of the device is disclosed, the mold part 62 conforming in all essentials to the bottom mold part of Figure 1. In this embodiment the closure member 64 is formed with a slightly different marginal channel 66 to accommodate a hollow sealing member 68 of some suitable flexible material, such as rubber or the like, openings 70 being provided to release the air within the opening therethrough upon compression thereof. This substantially cylindrical flexible member conforms to the interior contour of the marginal channel 66 and engages the upper edge of the walls forming the compartment in the lower mold part 62. In order to place this sealing member 68 under initial compression before fluid pressure is applied to the molding or pressure device, one or more brackets 72 are provided which are connected at one end to the mold part 62 as by means of the eyes or rings 74, these brackets having a part 76 extending inwardly and in which is threaded a screw 78. The screw 78 is provided at its upper end with a hand knob 80 and at its lower end with a spring seat or base 82 between which and a seat 84 provided on the marginal channel 66 is a coil spring 86. By turning the screws 38, the springs 86 are compressed to flatten the resilient member 68 to effect an initial sealing between the mold parts of the device. These springs also serve to hold the cover or closure member 64 in association with the lower mold part upon release of fluid pressure therefrom. In removing the compressed material from this mold or pressure device, the hand screws 78 may be released and the coil springs and brackets removed, after which the closure member 64 may be removed and the compressed material replaced by additional material undergoing treatment.

While I have herein described and upon the drawing shown illustrative embodiments of the invention, it is to be understood that the invention is not limited thereto but may comprehend other constructions, arrangements of parts, details, features and method steps without departing from the spirit of the invention.

I claim:

1. A mold for treating a compressible body of material containing a liquid, comprising a base having walls for receiving and holding said body of material, said base being provided with at least one opening and a filter bed communicating therewith between said base and body of material, a closure member movable with respect to said base and having a marginal channel adapted to receive said walls, and flexible sealing means between said walls and channel to provide a fluid-tight joint therebetween.

2. A mold for treating a compressible body of material containing a liquid, comprising a base having walls for receiving and holding said body of material, said base being provided with at least one opening and a filter bed communicating therewith between said base and body of material, a closure member movable with respect to said base and having a marginal channel adapted to receive said walls, and a resilient member disposed in said channel and engaging said walls to provide a fluid-tight joint therebetween.

3. A mold for treating a compressible body of material containing a liquid, comprising a base providing a receptacle for holding said body of material, said base being provided with a filter bed and at least one opening communicating therewith, a closure member for said base movable with respect thereto, said closure member having a marginal channel adapted to receive said walls, flexible mastic material disposed in said channel and engaging said walls to provide a fluid-tight joint therebetween, an absorption cushion between said body of material and closure member, and a liner disposed adjacent the walls of said base to facilitate removal of said body of material when compressed.

4. A mold for treating a compressible body of material containing a liquid, comprising a base providing a receptacle for holding said body of material, said base being provided with a filter bed and at least one opening communicating therewith, a closure member for said base movable with respect thereto, said closure member having a marginal channel adapted to receive said walls, a flexible member disposed in said channel and engaging said walls to provide a fluid-tight joint therebetween, a plurality of brackets connected to said base, and spring means disposed between said brackets and closure member to initially compress said flexible member.

JOHN R. BJORKLUND.